(12) United States Patent
Zhou et al.

(10) Patent No.: US 11,459,080 B2
(45) Date of Patent: Oct. 4, 2022

(54) TRANSFORMABLE STRATOSPHERIC AIRSHIP

(71) Applicant: The 38th Research Institute of China Electronics Technology Group Corporation, Anhui (CN)

(72) Inventors: Meng Zhou, Anhui (CN); Baihe Tan, Anhui (CN); Zhongxin Xu, Anhui (CN); Jinbiao Ju, Anhui (CN); Qi Li, Anhui (CN); Junxing Yuan, Anhui (CN)

(73) Assignee: The 38th Research Institute of China Electronics Technology Group Corporation, Hefei (CN)

( * ) Notice: Subject to any disclaimer, the term of this patent is extended or adjusted under 35 U.S.C. 154(b) by 25 days.

(21) Appl. No.: 17/015,247

(22) Filed: Sep. 9, 2020

(65) Prior Publication Data
US 2021/0155335 A1 May 27, 2021

Related U.S. Application Data

(63) Continuation of application No. PCT/CN2019/077575, filed on Mar. 9, 2019.

(30) Foreign Application Priority Data

Mar. 9, 2018 (CN) .......................... 201810196120.1

(51) Int. Cl.
*B64B 1/04* (2006.01)

(52) U.S. Cl.
CPC ..................... *B64B 1/04* (2013.01)

(58) Field of Classification Search
CPC .... B64B 1/00; B64B 1/02; B64B 1/04; B64B 1/58; B64B 2201/00
See application file for complete search history.

(56) References Cited

U.S. PATENT DOCUMENTS 3,486,719 A * 12/1969 Bock ......................... B64D 9/00
244/125
5,348,251 A * 9/1994 Ferguson .................. B64B 1/60
244/30
(Continued)

FOREIGN PATENT DOCUMENTS

CN 101229848 A 7/2008
CN 103466070 A 12/2013
(Continued)

OTHER PUBLICATIONS

CN 105644762A_Deng_Translation.*
FR2740755A1_Bernard_Translation.*

*Primary Examiner* — Assres H Woldemaryam
(74) *Attorney, Agent, or Firm* — Wayne IP LLC

(57) ABSTRACT

A transformable stratospheric airship includes an upper shell, a lower shell, a foldable hull, and a plurality of cable control mechanisms provided on the upper shell and the lower shell. The foldable hull includes a sealed body, a plurality of guide holes arranged outside the sealed body and a cable which passes through the guide holes according to a predetermined order. The cable is configured to keep a shape of the sealed body and connected to the cable control mechanisms to fix the sealed body to the upper shell and the lower shell. The foldable hull is foldable and extendable along a vertical direction of the transformable stratospheric airship by controlling a length of the cable via the cable control mechanisms.

5 Claims, 3 Drawing Sheets

(56) References Cited

U.S. PATENT DOCUMENTS

| | | | | |
|---|---|---|---|---|
| 6,371,409 B1 * | 4/2002 | Steele | ................... | B64B 1/14 |
| | | | | 244/30 |
| 2012/0312919 A1 * | 12/2012 | Heppe | ................... | B64B 1/00 |
| | | | | 244/33 |
| 2016/0355248 A1 * | 12/2016 | Goelet | ................... | B64B 1/20 |

FOREIGN PATENT DOCUMENTS

| | | | | |
|---|---|---|---|---|
| CN | 104417743 A | | 3/2015 | |
| CN | 104554698 A | | 4/2015 | |
| CN | 105644762 A | * | 6/2016 | |
| FR | 2740755 A1 | * | 5/1997 | ............ B64B 1/02 |
| WO | WO-9304916 A1 | * | 3/1993 | ............ B64B 1/02 |
| WO | WO-2011042316 A1 | * | 4/2011 | ............ B64B 1/02 |
| WO | 2013113866 A1 | | 8/2013 | |

* cited by examiner

TRANSFORMABLE STRATOSPHERIC AIRSHIP

CROSS-REFERENCE TO RELATED APPLICATIONS

This application is a continuation of International Patent Application No. PCT/CN 2019/077575, filed on Mar. 9, 2019, which claims the benefit of priority from Chinese Patent Application No. 201810196120.1, filed on Mar. 9, 2018. The content of the aforementioned applications, including any intervening amendments thereto, is incorporated herein by reference in its entirety.

TECHNICAL FIELD

The present application relates to airships, and more particularly to a transformable stratospheric airship.

BACKGROUND

An airship is an aircraft that is lifted off due to the buoyancy over its own weight, and has the advantages of long endurance in the air, high performance-price ratio, etc. A traditional airship with a main envelope and a ballonet has limited flying height, due to the limitation in the volume of the ballonet. A greater volume of the ballonet can increase the flying height of the airship, consequently, the pressure regulating system requires more energy and larger weight. When the airship flies to a higher altitude, the pressure head of the conventional axial flow fan is too low to maintain the shape of hull, so that a fan with heavier weight and complex structure is required. When the stratospheric airship flies at a low altitude, the large ballonet causes the stratospheric airship to have huge inertia. When the airship returns to the ground from a low altitude, the demand for energy and power is very strong, and the airship is difficulty operated, in addition, there is a high risk of an accident during landing.

The existing transformable airships adopt segmented hard envelope. The cross-sectional shape of the airship body is changed after a coordinated action of telescopic struts and fixed-length struts on the foldable bulkhead, so as to change the volume of the airship. Because the hard envelope is heavy and the air tightness is difficultly guaranteed, the existing transformable airships are not able to meet the requirements for safe use.

In addition, the existing airship often uses a petal-shaped gas bag, which is forced to change in shape during the deformation process, so that the petal-shaped gas bag is under non-uniform stress to readily have stress concentration, thereby having damage risk and poor deformation effect.

SUMMARY

In view of the problems in the prior art, the present disclosure provides a transformable stratospheric airship. The airship adopts a sealed body which is integral, and a cable arranged outside the sealed body is controlled by cable control mechanisms, so that the sealed body is foldable and extendable.

The technical solutions of the present application are described as follows.

The present disclosure provides a transformable stratospheric airship, comprising:
an upper shell;
a lower shell;
a foldable airship hull; and
a plurality of cable control mechanisms provided on the upper shell and the lower shell;
wherein the foldable airship hull comprises a sealed body, a plurality of guide holes arranged outside the sealed body, and a cable which passes through the guide holes according to a predetermined order; the cable is configured to keep the shape of the sealed body, and is connected to the cable control mechanisms to fix the sealed body to the upper shell and the lower shell; and the foldable airship hull is foldable and extendable along a vertical direction of the transformable stratospheric airship by controlling the length of the cable via the cable control mechanisms;

In some embodiments, a fabric is arranged outside the sealed body, and the guide holes are arranged on the fabric.

In some embodiments, the upper shell and the lower shell each comprise an envelope and a rigid support framework configured to support the envelope.

In some embodiments, the rigid support framework comprises an annular truss, a plurality of transverse keels and a plurality of longitudinal keels.

In some embodiments, the annular truss, the transverse keels and the longitudinal keels are made of carbon fiber frame structures.

In some embodiments, the envelope is a flexible layer or a rigid sheet.

In some embodiments, the cable control mechanisms are provided on the annular truss of the rigid support framework, and the cable control mechanisms are connected with each other through the cable.

In some embodiments, the airship further comprises tail fins, propellers, valves and batteries, which are mounted on the top of the upper shell.

In some embodiments, the battery is a solar battery.

In some embodiments, the transformable stratospheric airship further comprises a gondola, a landing gear and a mission payload, which are provided at the bottom of the lower shell.

Compared to the prior art, the present application has the following beneficial effects.

At a low flying height, the transformable stratospheric airship of the present application has a flat shape with low aerodynamic drag, at this time, the hull is folded by tightening the cable via the cable control mechanisms. At a high flying height, the lifting gas in the hull expands, and the cable control mechanisms release the cable to unfold the hull vertically, thus the volume of the airship increases. The airship of the present application has the advantages of simple design, light structure weight and convenient operation. In addition, the airship adopts the sealed body which is integral, and maintains the shape through the controlled cable, so that the hull hardly deforms, thereby rendering the use of the airship safe and reliable.

DETAILED DESCRIPTION OF EMBODIMENTS

The invention will be further described below in detail with reference to the accompanying drawings and the embodiments. It should be understood that these embodiments are merely illustrative of the present disclosure, and are not intended to limit the scope of the present disclosure.

Figure 1:
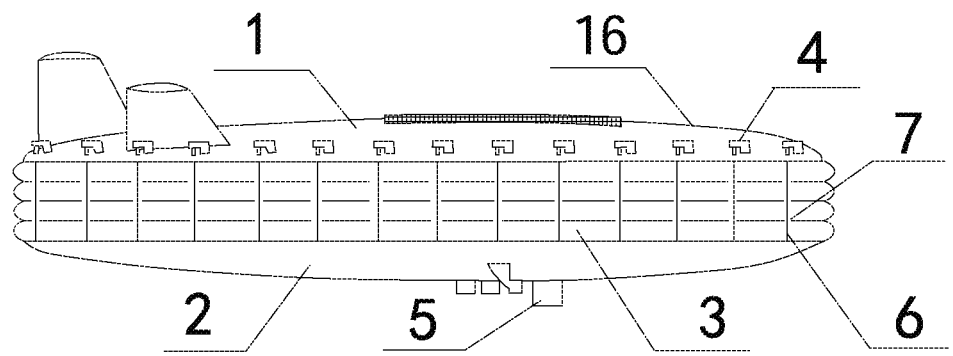
FIG. 1 is a schematic diagram of a transformable stratospheric airship in accordance with an embodiment of the present disclosure.

As shown in FIG. 1, a transformable stratospheric airship includes an upper shell 1, a lower shell 2, a foldable hull 3, and a plurality of cable control mechanisms 4 provided on the upper shell 1 and the lower shell 2.

Figure 2:
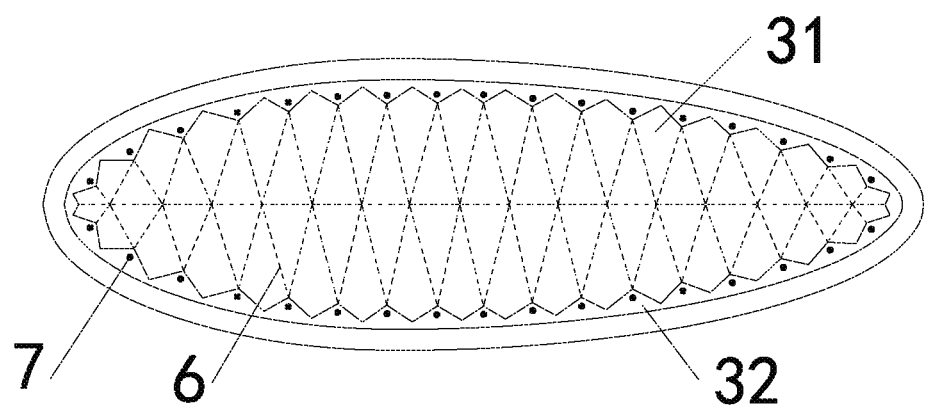
FIG. 2 is a schematic diagram of a foldable hull in accordance with an embodiment of the present disclosure.

In some embodiments, as shown in FIG. 2, the foldable hull 3 includes a sealed body 31, a plurality of guide holes 7 arranged outside the sealed body 31 and a cable 6 which passes through the guide holes 7 according to a predetermined order.

The cable 6 is configured to keep the shape of the sealed body 31, and is connected to the cable control mechanisms 4 to fix the sealed body 31 to the upper shell 1 and the lower shell 2. The foldable hull 3 is foldable and extendable along a vertical direction of the transformable stratospheric airship by controlling the length of the cable 6 via the cable control mechanisms 4.

In some embodiments, a fabric 32 is arranged outside the sealed body 31, and the guide holes 7 are arranged on the fabric 32. The cable 6 passes through the guide holes 7 according to a predetermined order, and the foldable hull 31 is vertically foldable and extendable by controlling the length of the cable 6 via the cable control mechanisms 4. In the present application, the cable 6 passes through the guide holes 7 to play a guiding role, thereby prevent the shake of the foldable hull 3 during flight.

Figure 3:
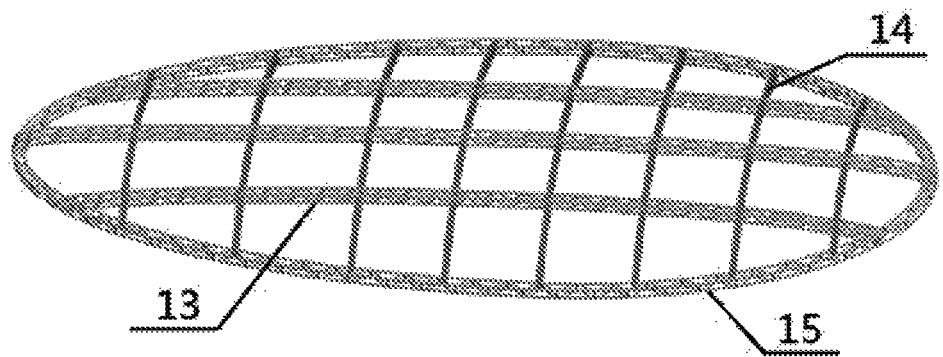
FIG. 3 is a schematic diagram of a rigid support framework in accordance with an embodiment of the present disclosure.

In some embodiments, the upper shell 1 and the lower shell 2 each include an envelope 16 and a rigid support framework configured to support the envelope. As shown in FIG. 3, the rigid support framework includes an annular truss 15, a plurality of transverse keels 14, and a plurality of longitudinal keels 13. Considering the engineering feasibility, the annular truss 15, the transverse keels 14, and the longitudinal keels 13 are made of carbon fiber frame structures for the ease of assemble and disassemble. Furthermore, the envelope 16 is a flexible layer or a rigid sheet according to the practical need.

In some embodiments, the cable control mechanisms 4 are provided on the annular truss 15 of the rigid support framework, and connected with each other through the cable 6.

Figure 4:
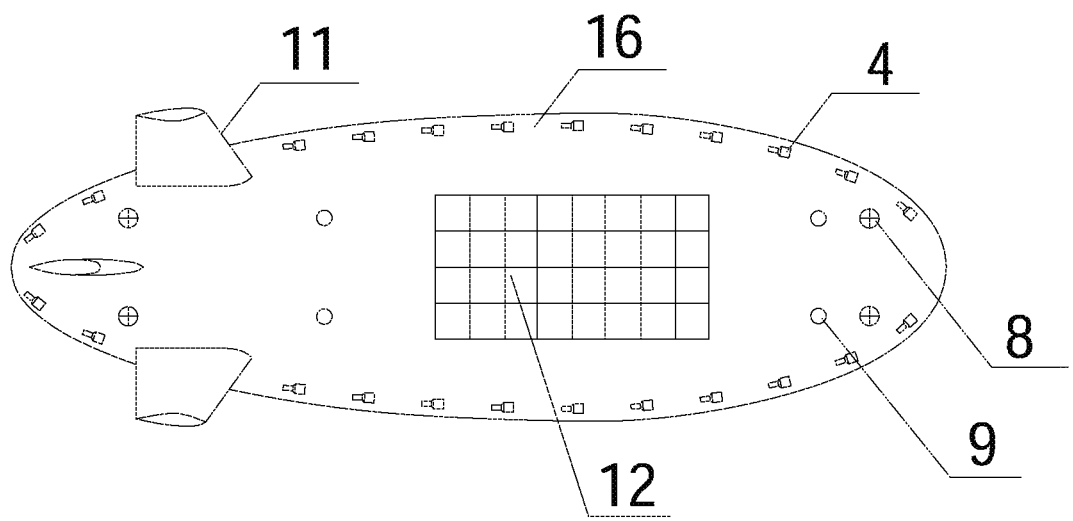
FIG. 4 is a top view of an upper shell of the transformable stratospheric airship in accordance with the present disclosure.

In some embodiments, as shown in FIGS. 1 and 4, the transformable stratospheric airship of the present embodiment also includes a tail fin 11, a propeller 8, a valve 9 and a battery 12, which are mounted on the top of the upper shell 1. In an embodiment, the battery 12 is a solar battery, which is arranged on the flat part outside the upper shell 1.

In some embodiments, the tail fin 11 is configured to control the motion of the airship such as roll, yaw and pitch. The propeller is configured to drive the airship. The valve 9 is configured to exhaust lifting gas (helium or hydrogen) in the sealed body.

In some embodiments, the bottom of the lower shell 2 of the transformable stratospheric airship is also provided with a gondola 5, and some common devices such as an inflation inlet, a landing gear and a mission payload, which are not shown in the figures.

Figure 5:
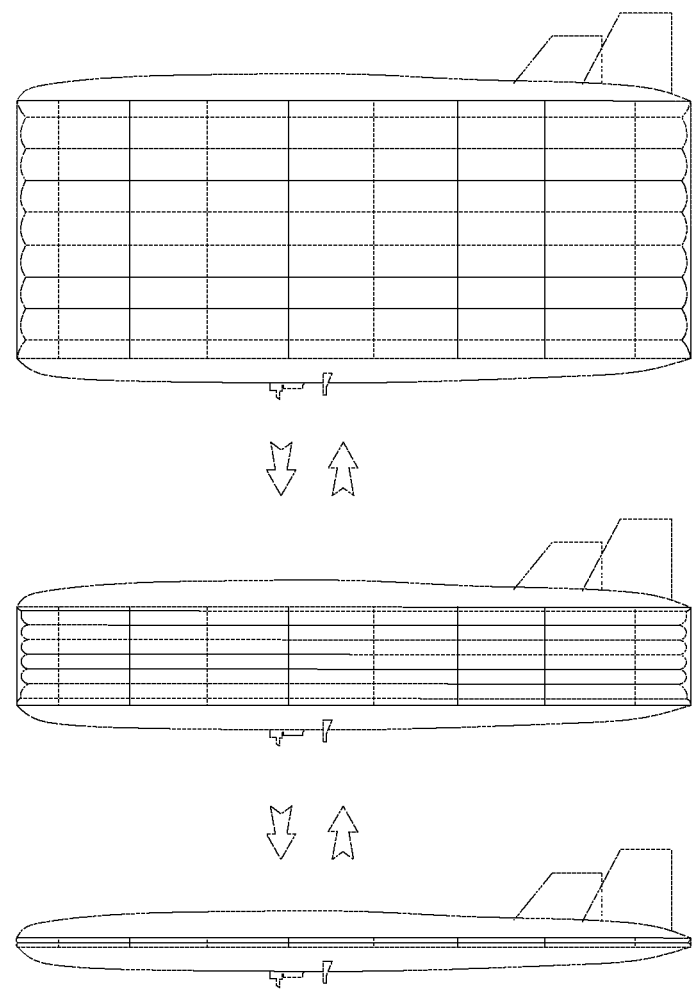
FIG. 5 schematically shows transformation of the transformable stratospheric airship in accordance with an embodiment of the present disclosure.

The present embodiment provides a transformable stratospheric airship, as shown in FIG. 5. At the high flying height, the lifting gas in the hull expands and the cable control mechanisms release the cable to unfold the hull vertically, and thus the volume of the airship increases. When the airship needs to land or fly at the low altitude, the cable is tightened by the cable control mechanisms to gradually fold the hull until the airship is completely folded, at this time, the airship has a flat shape with low aerodynamic drag.

The airship of the present application has the advantages of simple design, light structure and convenient operation. In addition, the airship adopts the sealed body which is integral, and maintains the shape through the controlled cable, so that the hull hardly deforms, thereby rendering the use of the airship safe and reliable.

The above are only the preferred embodiments of the present disclosure, and are not intended to limit the scope of the present disclosure. Any changes, equivalent modifications and improvements made by those skilled in the art without departing from the spirit of the present disclosure shall fall within the scope of the present disclosure. The scope of the present disclosure is defined by the appended claims

What is claimed is:

1. A transformable stratospheric airship, comprising:
an upper shell;
a lower shell;
a foldable hull; and
a plurality of cable control mechanisms provided on the upper shell;
wherein the foldable hull comprises a sealed body, a plurality of guide holes arranged outside the sealed body, and a cable which passes through the guide holes according to a predetermined order; the cable is configured to keep the shape of the sealed body, and is connected to the cable control mechanisms to fix the sealed body to the upper shell and the lower shell; and the foldable hull is foldable and extendable along a direction perpendicular to a length direction of the transformable stratospheric airship by controlling a length of the cable via the cable control mechanisms;
the upper shell comprises an envelope and a rigid support framework configured to support the envelope;
the rigid support framework comprises an annular truss, a plurality of transverse keels and a plurality of longitudinal keels;
the transformable stratospheric airship further comprises a tail fin, a propeller, a valve and a battery which are mounted on a top of the upper shell; and
the cable control mechanisms are provided on the annular truss of the rigid support framework, and the cable control mechanisms are connected with each other through the cable.

2. The transformable stratospheric airship of claim 1, wherein a fabric is arranged outside the sealed body, and the guide holes are arranged on the fabric.

3. The transformable stratospheric airship of claim 1, wherein the annular truss, the transverse keels and the longitudinal keels are made of carbon fiber frame structures.

4. The transformable stratospheric airship of claim 1, wherein the envelope is a flexible layer or a rigid sheet.

5. The transformable stratospheric airship of claim 1, wherein the battery is a solar battery.

* * * * *